(12) United States Patent
Tateno et al.

(10) Patent No.: US 7,885,264 B2
(45) Date of Patent: Feb. 8, 2011

(54) COMMUNICATIONS SYSTEM, COMMUNICATIONS DEVICE, AND DATA RETRANSMISSION CONTROL METHOD

(75) Inventors: Shuji Tateno, Tokyo (JP); Masaya Teraoka, Tokyo (JP); Tetsuji Tamagawa, Tokyo (JP)

(73) Assignee: Nomura Research Institute Co., Ltd., Tokyo (JP)

( * ) Notice: Subject to any disclaimer, the term of this patent is extended or adjusted under 35 U.S.C. 154(b) by 716 days.

(21) Appl. No.: 10/572,501

(22) PCT Filed: Sep. 16, 2004

(86) PCT No.: PCT/JP2004/013533

§ 371 (c)(1),
(2), (4) Date: Mar. 17, 2006

(87) PCT Pub. No.: WO2005/027456

PCT Pub. Date: Mar. 24, 2005

(65) Prior Publication Data

US 2007/0064705 A1 Mar. 22, 2007

(30) Foreign Application Priority Data

Sep. 18, 2003 (JP) ............................. 2003-325951

(51) Int. Cl.
*H04L 12/56* (2006.01)

(52) U.S. Cl. .................... 370/394; 370/230; 370/395.1; 370/233

(58) Field of Classification Search .......... 370/230–235
See application file for complete search history.

(56) References Cited

U.S. PATENT DOCUMENTS 5,754,754 A * 5/1998 Dudley et al. ................. 714/18

(Continued)

FOREIGN PATENT DOCUMENTS

JP 62239737 A * 10/1987

(Continued)

OTHER PUBLICATIONS

"RFC Transmission Control Protocol Darpa Internet Program Protocol Specification" Sep. 1981. 1-85.

(Continued)

*Primary Examiner*—Huy D Vu
*Assistant Examiner*—Zewdu Beyen
(74) *Attorney, Agent, or Firm*—Brundidge & Stanger, P.C.

(57) ABSTRACT

An object is to transmit data such that the transmission speed is not reduced even in a transmission route with a comparatively high percentage of packet loss.

The transmitter 1 comprises: a data transmission unit 11 which transmits data packets 50 comprising data, a data sequence number indicating the order of the data, and a transmission sequence number indicating the transmission order, and which receives acknowledgement packets 60 comprising the next data sequence number, a bit string indicating the reception status, and a received transmission sequence number; a transmission history memory unit 14 which memorizes the transmission history of the data packets transmitted by the data transmission unit 11; and a retransmission control unit 12 which refers to the transmission history memory unit 14 and specifies the data sequence numbers requiring retransmission based on the received acknowledgement packets 60, and which directs the data transmission unit 11 to retransmit. The receiver 2 comprises a data reception unit 21 which receives data packets 50 transmitted from the transmitter 1, and which produces and transmits to the transmitter 1 acknowledgement packets 60 corresponding to these packets.

17 Claims, 8 Drawing Sheets

U.S. PATENT DOCUMENTS

| | | | | |
|---|---|---|---|---|
| 5,872,777 | A * | 2/1999 | Brailean et al. | 370/349 |
| 6,128,283 | A * | 10/2000 | Sabaa et al. | 370/236 |
| 6,449,631 | B1 * | 9/2002 | Takamoto et al. | 709/200 |
| 6,895,010 | B1 * | 5/2005 | Chang et al. | 370/394 |
| 7,099,284 | B2 * | 8/2006 | Halme | 370/253 |
| 7,120,172 | B1 * | 10/2006 | Aribindi et al. | 370/524 |
| 7,124,333 | B2 * | 10/2006 | Fukushima et al. | 714/701 |
| 7,180,896 | B1 * | 2/2007 | Okumura | 370/394 |
| 7,200,111 | B2 * | 4/2007 | Garcia-Luna-Aceves et al. | 370/230 |
| 2002/0080792 | A1 * | 6/2002 | Rosier | 370/394 |
| 2002/0172192 | A1 * | 11/2002 | Hunzinger et al. | 370/352 |
| 2003/0120802 | A1 * | 6/2003 | Kohno | 709/237 |
| 2003/0156572 | A1 * | 8/2003 | Hui et al. | 370/349 |
| 2004/0042452 | A1 * | 3/2004 | Cayla | 370/389 |
| 2004/0148396 | A1 * | 7/2004 | Meyer et al. | 709/227 |
| 2004/0181740 | A1 * | 9/2004 | Tomaru et al. | 714/776 |
| 2006/0023715 | A1 * | 2/2006 | Chen et al. | 370/389 |
| 2006/0187870 | A1 * | 8/2006 | Zhu et al. | 370/320 |
| 2006/0209904 | A1 * | 9/2006 | Lee et al. | 370/511 |
| 2006/0256794 | A1 * | 11/2006 | Rezaiifar et al. | 370/394 |
| 2007/0162810 | A1 * | 7/2007 | Sato et al. | 714/748 |
| 2008/0209300 | A1 * | 8/2008 | Fukushima et al. | 714/748 |

FOREIGN PATENT DOCUMENTS

| | | |
|---|---|---|
| JP | 9-307535 | 11/1997 |
| JP | 2000-83013 | 3/2000 |

OTHER PUBLICATIONS

Network Working Group Request for Comments: 2001 Category: Standards Track. W. Stevens, Jan. 1997. 1-6, "TCP Slow Start, Congestion Avoidance, Fast Retransmit, and Fast Recovery Algorithms".

Network Working Group Request for Comments: 2018 Category: Standards Track, M. Mathis, et al. pp. 1-12.

* cited by examiner

50 DATA TRANSMISSION PACKET

60 ACKNOWLEDGEMENT PACKET

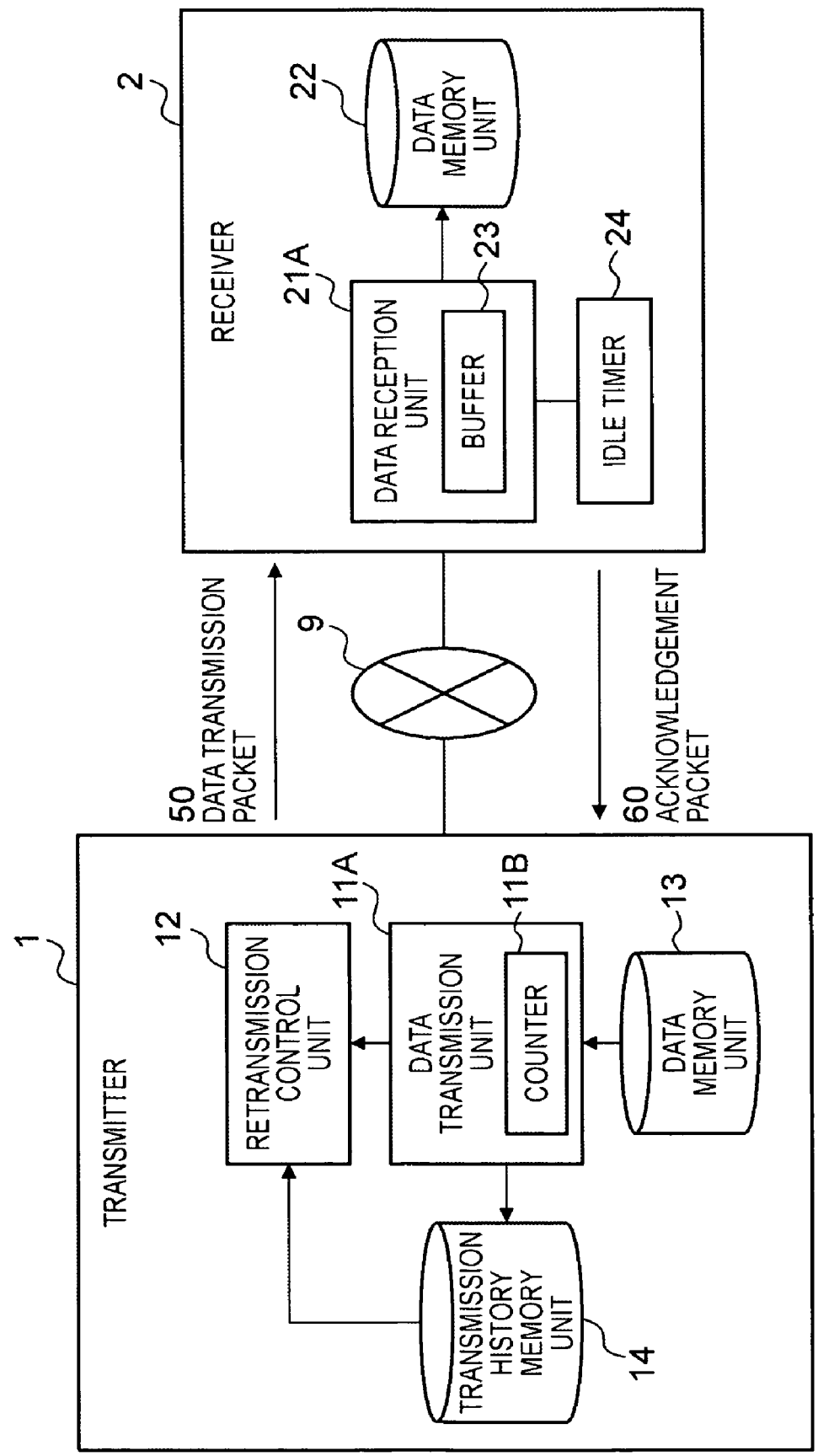

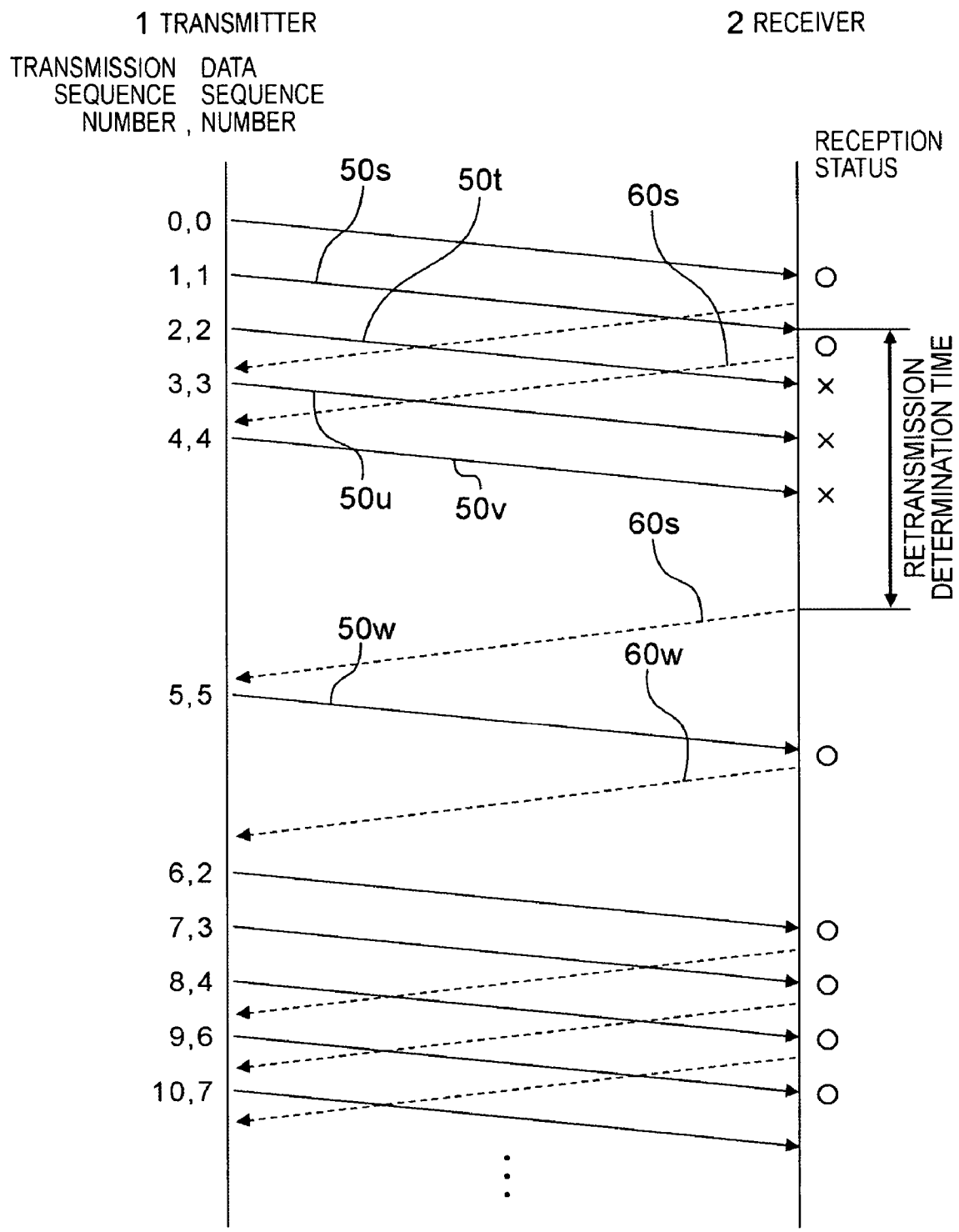

COMMUNICATIONS SYSTEM, COMMUNICATIONS DEVICE, AND DATA RETRANSMISSION CONTROL METHOD

TECHNICAL FIELD

The present invention relates to technology for retransmitting data when packet loss occurs, and more particularly relates to technology for retransmitting data so that the transmission speed does not decrease even with a transmission route having a high percentage of packet loss.

BACKGROUND ART

TCP (Transmission Control Protocol), the most widespread IP (Internet Protocol) communications technology, has the following two functions for retransmission control. These are a fast retransmit function (Fast Retransmit) in which the transmitting side retransmits when three retransmission requests relating to packet loss are received from the receiving side, and a SACK (Selective ACK) option function that contains packet reception data in the acknowledgement information (ACK).

[Non-patent Literature 1] TCP: RFC793 (http://www.faqs.org/rfcs/rfc2001.html)

[Non-patent Literature 2] Fast Retransmit: RFC2001 (http://www.faqs.org/rfcs/rfc2001.html)

[Non-patent Literature 3] SACK: RFC2018 (http://www.faqs.org/rfcs/rfc2018.html)

DISCLOSURE OF THE INVENTION

Problems to be Resolved by the Invention

Nonetheless, in the fast retransmit function, further retransmission (re-retransmission) is not conducted even if the resent data has not arrived, and therefore in this case communications must wait for retransmitting based on a time out. This is because the transmitting side cannot confirm whether or not the resent packet has arrived. If re-retransmitting while arrival of the retransmitted packet is unconfirmed, then packets that should not have been necessary in the first place may flow on the transmission route and pose the risks of further deterioration of transfer efficiency and the promotion of congestion.

Moreover, when utilizing the SACK option function, the size of the acknowledgement information retransmitted from the receiver side is large. Normally, packet loss occurs when the transmission route is crowded, and therefore if large volume data is flowing, further deterioration of transfer efficiency and the promotion of congestion tend to occur. In addition, if the number of packets that may be lost increases, the SACK option can then no longer send all of the reception information to the transmitting side.

Thus, an object of the present invention is to offer a technology for transferring data so that the transmission speed does not decrease even on transmission routes with a comparatively high packet loss percentage.

Another object of the present invention is to offer a technology for immediately retransmitting the necessary minimum retransmission data when packet loss has been ascertained.

Yet another object of the present invention is to prevent congestion caused by redundant retransmission.

The communications system according to one embodiment of the present invention comprises a transmitter and a receiver. The aforementioned transmitter comprises: means for transmitting data packets comprising data, data sequence numbers indicating the order of the aforementioned data, and transmission sequence numbers indicating the transmission order; means for receiving acknowledgement packets, transmitted by the receiver that has received the aforementioned data packets, comprising the transmission sequence number of the aforementioned data packets, and information indicating the reception status of data preceding in order the data sequence number of the aforementioned data packet; memory means for memorizing the transmission history of the data packets that the aforementioned transmission means has transmitted; and means for specifying the data sequence number requiring retransmission based on the aforementioned received acknowledgment packet by referring to the aforementioned memory means, and for directing the aforementioned transmission means to retransmit data related to the aforementioned specified data sequence number. The aforementioned receiver comprises: means for receiving the aforementioned data packets transmitted from the aforementioned transmitter; and means for transmitting to the aforementioned transmitter acknowledgement packets comprising the transmission sequence number of the aforementioned received data packets, and information indicating the reception status of data preceding in order the data sequence number of the aforementioned received data packet.

In a preferable embodiment, the aforementioned means for directing retransmission may be comprised to extract the data sequence number which the aforementioned transmitter has transmitted but the aforementioned receiver has not received based on data indicating the aforementioned reception status included in the aforementioned acknowledgement packets, acquire from the aforementioned memory means the transmission sequence numbers of the data-packets for which the data related to the aforementioned extracted data sequence numbers has been sent, and specify the data sequence numbers requiring retransmission based on the aforementioned acquired transmission sequence numbers and transmission sequence numbers contained in the aforementioned acknowledgement packets.

In a preferable embodiment, the information indicating the aforementioned reception status may comprise information in which the reception status of data relating to the data sequence numbers between the value of the highest of the data sequence numbers for which reception has been completed consecutively and the value of the highest of the received data sequence numbers is indicated by a bit string.

In a preferable embodiment the aforementioned receiver further comprises a buffer that temporarily stores data sequence numbers contained in data packets that the aforementioned data packet receiving means has received, and means for producing the aforementioned acknowledgement packets by referring to the aforementioned buffer.

The communications device according to one embodiment of the present invention comprises: means for transmitting data packets comprising data, data sequence numbers indicating the order of the aforementioned data, and transmission sequence numbers indicating the transmission order; means for receiving acknowledgement packets, sent back by the communications device that has received the aforementioned data packets, comprising the transmission sequence number of the aforementioned data packets, and information indicating the reception status of data preceding in order the data sequence number of the aforementioned data packet; memory means for memorizing the transmission history of the data packets that the aforementioned transmission means has transmitted; and means for specifying the data sequence number requiring retransmission based on the aforementioned received acknowledgment packet by referring to the aforementioned memory means, and for directing the aforementioned transmission means to retransmit data related to the aforementioned specified data sequence number.

The communications device according to one embodiment of the present invention comprises: means for receiving the data packets comprising data, data sequence numbers indicating the order of the aforementioned data, and transmission sequence numbers indicating the transmission order; and means for transmitting to the transmission source of the aforementioned data packets acknowledgement packets comprising the transmission sequence number of the aforementioned received data packets, and information indicating the reception status of data preceding in order the data sequence number of the aforementioned received data packet.

The communications system according to one embodiment of the present invention comprises a transmitter and a receiver. The aforementioned transmitter comprises: transmission means for individually transmitting divided data, which is divided transmission data; memory means for memorizing the transmission history of the divided data that the aforementioned transmission means has transmitted; means for receiving acknowledgement comprising information indicating the reception status of the aforementioned receiver prior to one of the aforementioned divided data, which is acknowledgement that confirms reception of one divided data; and means that references the aforementioned memory means, specifies the data requiring retransmission based on the aforementioned received acknowledgement, and directs the aforementioned transmission means for retransmitting the aforementioned specified divided data. In addition, the aforementioned receiver comprises a reception means for receiving divided data transmitted from the aforementioned transmitter; and acknowledgement transmission means that, when the aforementioned reception means receives divided data, produces and transmits to the aforementioned transmitter acknowledgement comprising information indicating the reception status prior to the related received divided data.

The communications system according to one embodiment of the present invention comprises a transmitter to transmit data packets, and a receiver that sends back to the aforementioned transmitter acknowledgement packets when the aforementioned data packets are received. The aforementioned transmitter comprises transmission means for controlling the transmission of data packets such that the number of sent data packets for which no acknowledgement packet has been received becomes a specified number or less. Moreover, the aforementioned receiver comprises a timer that, during the interval after the first data packet is received until the second data packet that arrives next is received, measures the time elapsed after receiving the aforementioned first data packet; and means for transmitting to the aforementioned transmitter information indicating that no data packet has been received in the specified time or more if the time that the aforementioned timer has measured reaches or exceeds a specified time.

A preferable embodiment may be made such that, if the aforementioned transmitter receives information indicating that no data packet has been received in more than the aforementioned specified time, the aforementioned transmission means transmits the next data packet even though the number of transmitted data packets for which acknowledgement packets have not been received is the specified number or more.

In a preferable embodiment, divided data, which is divided transmission data, is stored in a data packet that the aforementioned transmitter transmits. Moreover, information indicating the reception status of the aforementioned divided data is included in acknowledgement packets that the aforementioned receiver transmits. Then, the aforementioned transmitter may also comprise: memory means for memorizing the transmission history of data packets comprising the aforementioned divided data that the aforementioned transmission means has transmitted; and means for specifying the divided data that requiring retransmission based on the transmission history memorized in the aforementioned memory means and on the reception status of divided data included in the aforementioned acknowledgement packets, and for directing the aforementioned transmission means to retransmit the aforementioned specified divided data.

A preferable embodiment may be made such that, after transmitting data packets for all the data, the aforementioned transmission means transmits dummy packets that comprise the aforementioned data sequence number and aforementioned transmission sequence number, and do not comprise data.

The communications device according to one embodiment of the present invention comprises: a receiving means that receives data packets and transmits acknowledgement packets to the communications device that is the transmission source of the aforementioned received data packets; a timer that, during the interval after the aforementioned receiving means receives the first data packet until receiving the second data packet that arrives next, measures the time elapsed since receiving the aforementioned first data packet; and means for transmitting to the aforementioned transmission source of the aforementioned data packets information indicating that no data packet has been received in the specified time or more if the time that the aforementioned timer has measured reaches or exceeds a specified time.

The communications device according to one embodiment of the present invention comprises: a counter that counts the number of transmitted data packets for which acknowledgement packets have not been received, and transmission means that controls the transmission of packets such that the aforementioned counted value does not become a specified number or less. Then, if information indicating that no data packets have been received for a specified time or less is received from the destination communications device, the aforementioned transmission means transmit the next data packet even though the aforementioned counter value is the specified number or more.

BRIEF DESCRIPTION OF THE DRAWING

FIG. 8 is a diagram indicating the configuration of a communications system related a second embodiment of the present invention; and FIG. 9 is a chart of a data transceiver sequence that occurs between a transmitter 1 and a receiver 2.

BEST MODE FOR CARRYING OUT THE INVENTION

The data communications system relating to a first embodiment of the present invention will be explained below using diagrams.

Figure 1:
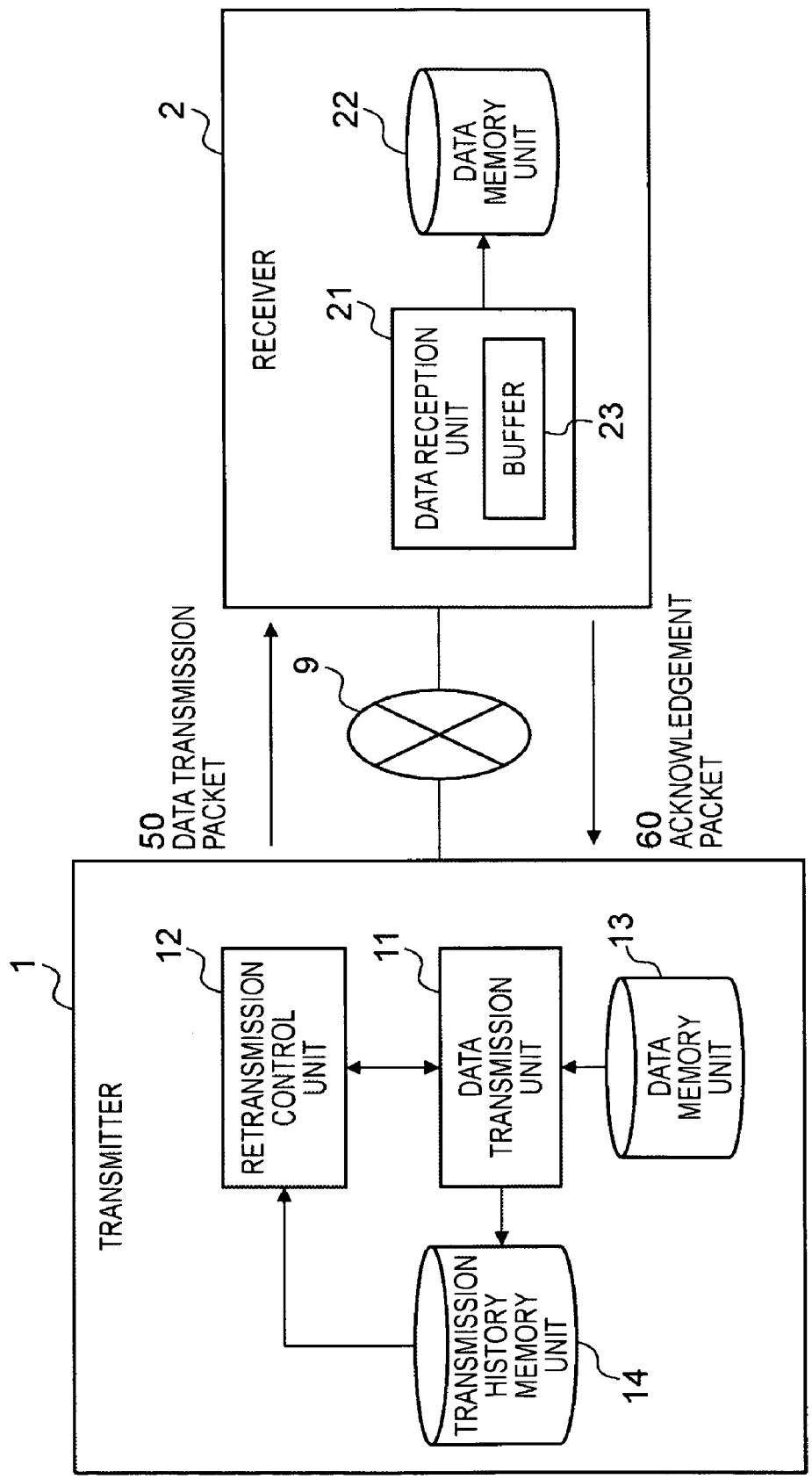
FIG. 1 is a diagram indicating the configuration of a communications system related to a first embodiment of the present invention.

FIG. 1 indicates the device configuring the present system. The present system comprises a transmitter 1 that is a communications device that transmits data; and a receiver 2 that is a communications device that receives data. The transmitter 1 transmits a data transmission packet 50 (refer to FIG. 2) to the receiver 2. The receiver 2 sends an acknowledgement packet 60 when receiving the data transmission packet 50. The transmitter 1 and the receiver 2 communicate through the fixed line or wireless network 9. In the present embodiment, for example, the transmitter 1 and the receiver 2 communicate using UDP (User Datagram Protocol)/IP.

The transmitter 1 and the receiver 2 can also be configured by a computer system having, for example, several communications functions. In this case, the individual configuration elements or functions within the transmitter 1 and the receiver 2, which are explained below, are realized, for example, by executing computer programs. Specifically, the receiver 2 may be for example, a portable telephone, a PDA (Personal Data Assistant), or a personal computer comprising a wireless communications function.

As indicated in the same diagram, the transmitter 1 comprises a data transmission unit 11, a retransmission control unit 12, a data memory unit 13, and a transmission history memory unity 14.

The data transmission unit 11 acquires transmission target data from the data memory unit 13, and produces and outputs to the network 9 data transmission packets 50.

Figure 2:
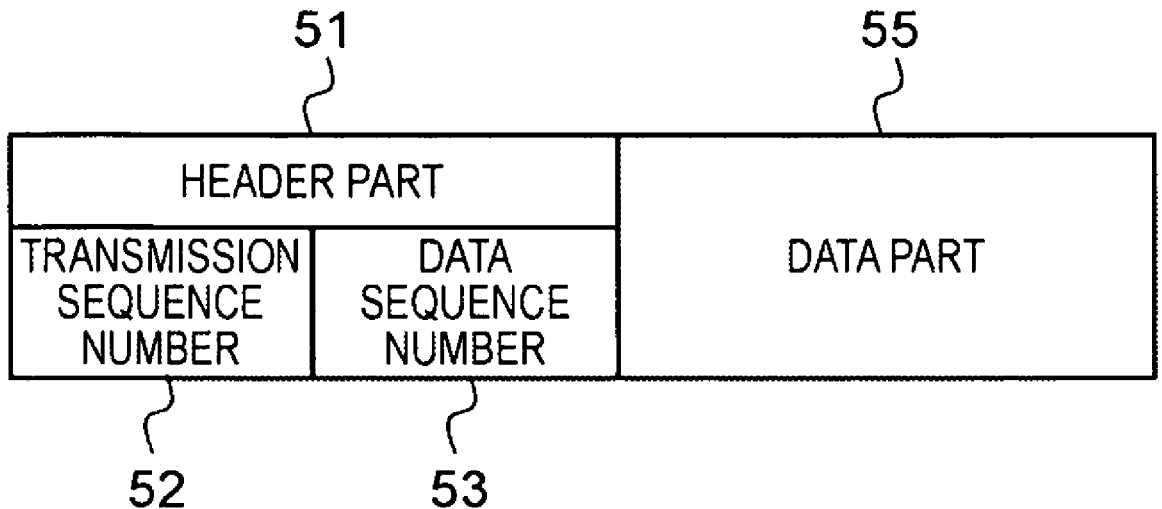
FIG. 2 is a diagram indicating one example of the format of a data transmission packet 50.

The format of a data transmission packet 50 is indicated in FIG. 2. As indicated in the same diagram, the data transmission packet 50 comprises a header part 51 and a data part 55, and the header part 51 further comprises a transmission sequence number 52 and a data sequence number 53.

The transmission sequence number 52 is a number allocated to a packet that the transmitter 1 sends to the receiver 2. The transmission sequence number 52 is, for example a number in continuous sequence from 0 (sequence number), and is a number unique to each packet. The transmission sequence number 52 is not related to data sequence number 53 or to the content of the data stored in the data part 55, and is incremented every time a packet is transmitted. A will be described later, when packet loss occurs wherein the transmitted data does not arrive at the receiver 2, this data is retransmitted. At that time, a transmission sequence number 52, which differs from that of the packet that did not arrive and which is unique to the retransmission packet, is attached to this retransmission packet.

Data sequence number 53 is a number allotted to the data stored in the data part 55. The data sequence numbers 53 are, for example, sequential numbers from 0. Normally, the data targeted for transmission is larger than the size of the data part 55, and therefore is transmitted by dividing into portions the size of the data part 55. Thus, the data sequence numbers 53 are used in order to indicate the divided data and the order. Consequently, the sequence numbers 53 are stipulated based on the data stored in the data part 55. When packet loss occurs, the data targeted for retransmission is specified by the data sequence number 53.

Figure 3:
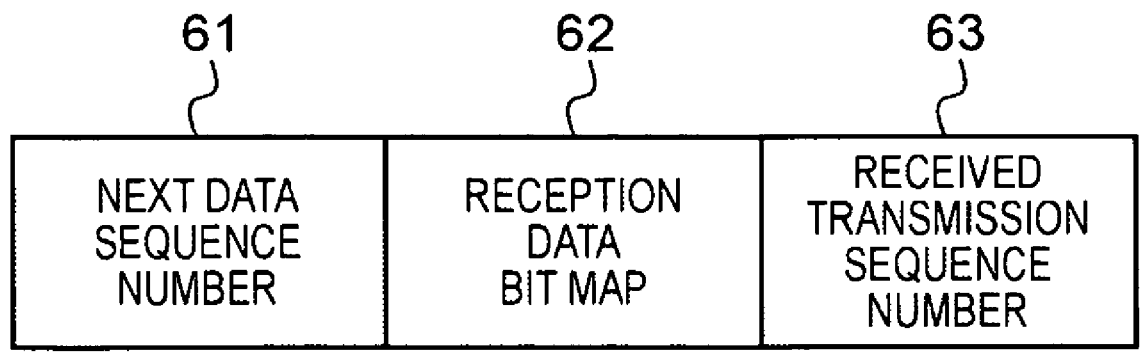
FIG. 3 is a diagram indicating one example of the format of an acknowledgement packet 60.

Moreover, the data transmission unit 11 receives the acknowledgement packet 60 corresponding to the data transmission packet 50. The format of the acknowledgement packet 60 is indicated in FIG. 3. The acknowledgement packet 60 comprises a next data sequence number 61, a reception status bit string 62, and a received transmission sequence number 63 as indicated in the same diagram.

The next data sequence number 61 indicates the data sequence number that the receiver 2 should receive next. Specifically, this number adds 1 to the value of the highest of the continuous data sequence numbers from among the data sequence numbers that have already been received. For example, if the receiver 2 has received all data up to the data sequence number (N), then the next data sequence number 61 will be (N+1).

The reception status bit string 62 is a bit string that indicates the reception status of the data sequence numbers after the next data sequence number 61. Here, each bit corresponds to one data sequence number. Then, the bits corresponding to the received data sequence numbers are "1", and the bits corresponding to the not received data sequence numbers are "0".

For example, the data sequence numbers from the next data sequence number 61 to the value of the highest of the received data sequence numbers are made to correspond in the order from the lowest bit (right end) of reception status bit string 62. Consequently, the lowest order bit is usually "0" (received), and the highest order bit is usually "1" (not received). For example, if the next data sequence number 61 is "2", the data sequence number "3" is not received, the data sequence number "4" is received, and the value of the highest of the received data sequence numbers is "4", then the reception status bit string 62 is "100" (corresponding to data sequence numbers "4" "3" "2" from the high order bit). However, if packet loss has not occurred, the next data sequence number 61 is larger than the received data sequence number, and therefore, the reception status bit string 62 is expressed by "0" (1 bit) at this time.

The received transmission sequence number 63 indicates the transmission sequence number received immediately prior to outputting the acknowledgement packet 60.

The retransmission controller 12 specifies the data that must be retransmitted based on the acknowledgement packet 60, and directs retransmission to the data transmission unit 11. The manner of specifying retransmission data will be explained in detail later.

The transmission history memory unit 14 memorizes the transmission log. For example, if the data transmission unit 11 has output a data transmission packet 50 to the network 9, the header part 51 of this packet may be stored in the transmission history memory unit 14.

Referring once more to FIG. 1, the receiver 2 comprises a data reception unit 21, a data memory unit 22 that memorizes received data. The data reception unit 21 is further comprised of a buffer that temporarily memorizes the received data.

The data reception unit 21 receives the data transmission packets 50 that are sent from the transmitter 1. The data reception unit 21 temporarily stores, in the buffer 23, the data sequence number 53 and the data contained in the data part 55 of the received data transmission packet 50, arranges the data sequence number 53 in order, and stores each fixed quantity of data in the data memory unit 22. Moreover, when receiving a data transmission packet 50, the data reception unit 21 produces and outputs to the network 9 an acknowledgement packet 60. The next data sequence number 61 and the reception status bit string 62 of this acknowledgement packet 60 are stipulated by referring to the buffer 23. The received transmission sequence number 63 is the transmission sequence number 52 of the data transmission packet 50 received immediately prior.

Figure 4:
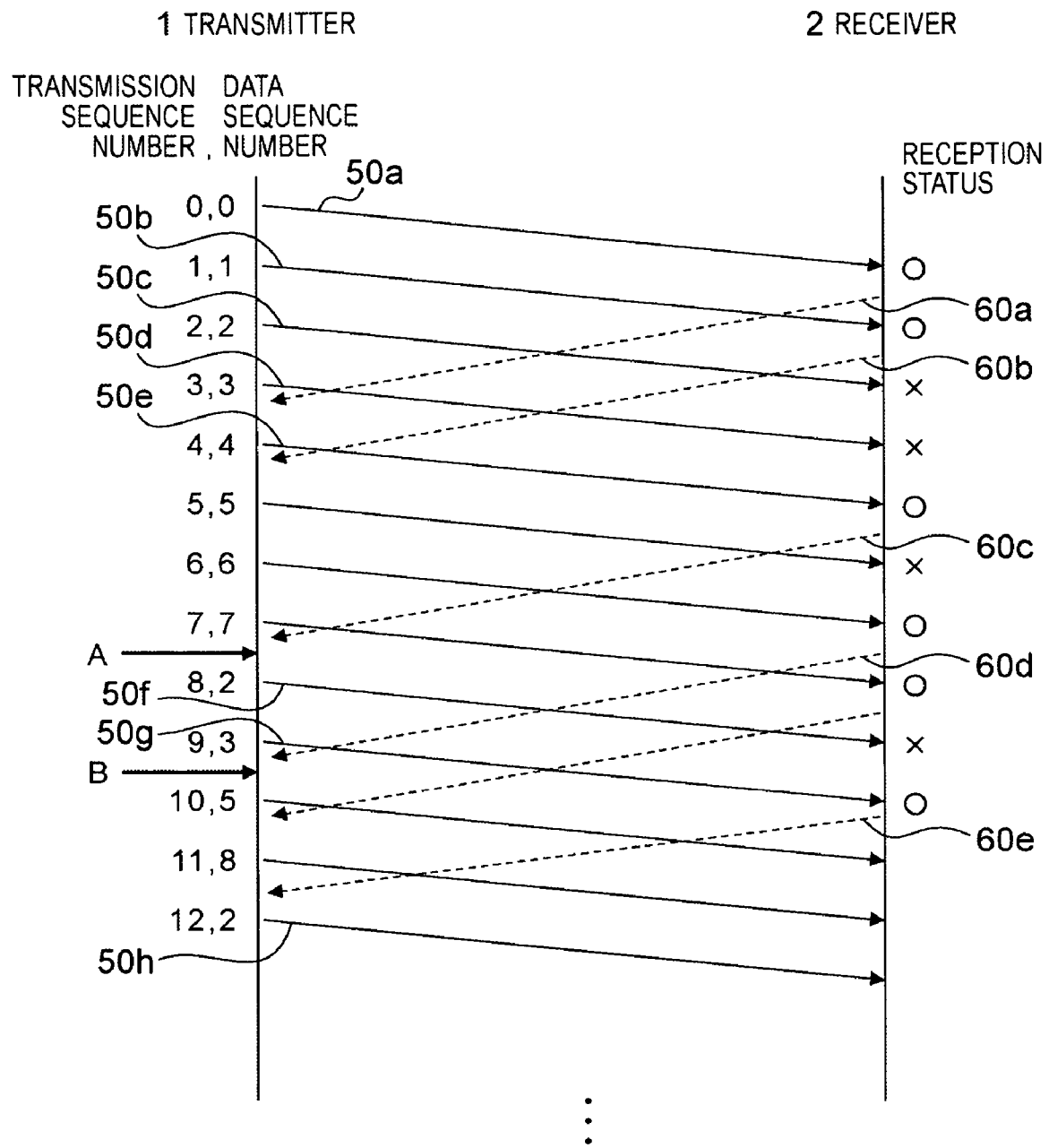
FIG. 4 is a chart of a data transceiver sequence that occurs between a transmitter 1 and a receiver 2.
Figure 5:
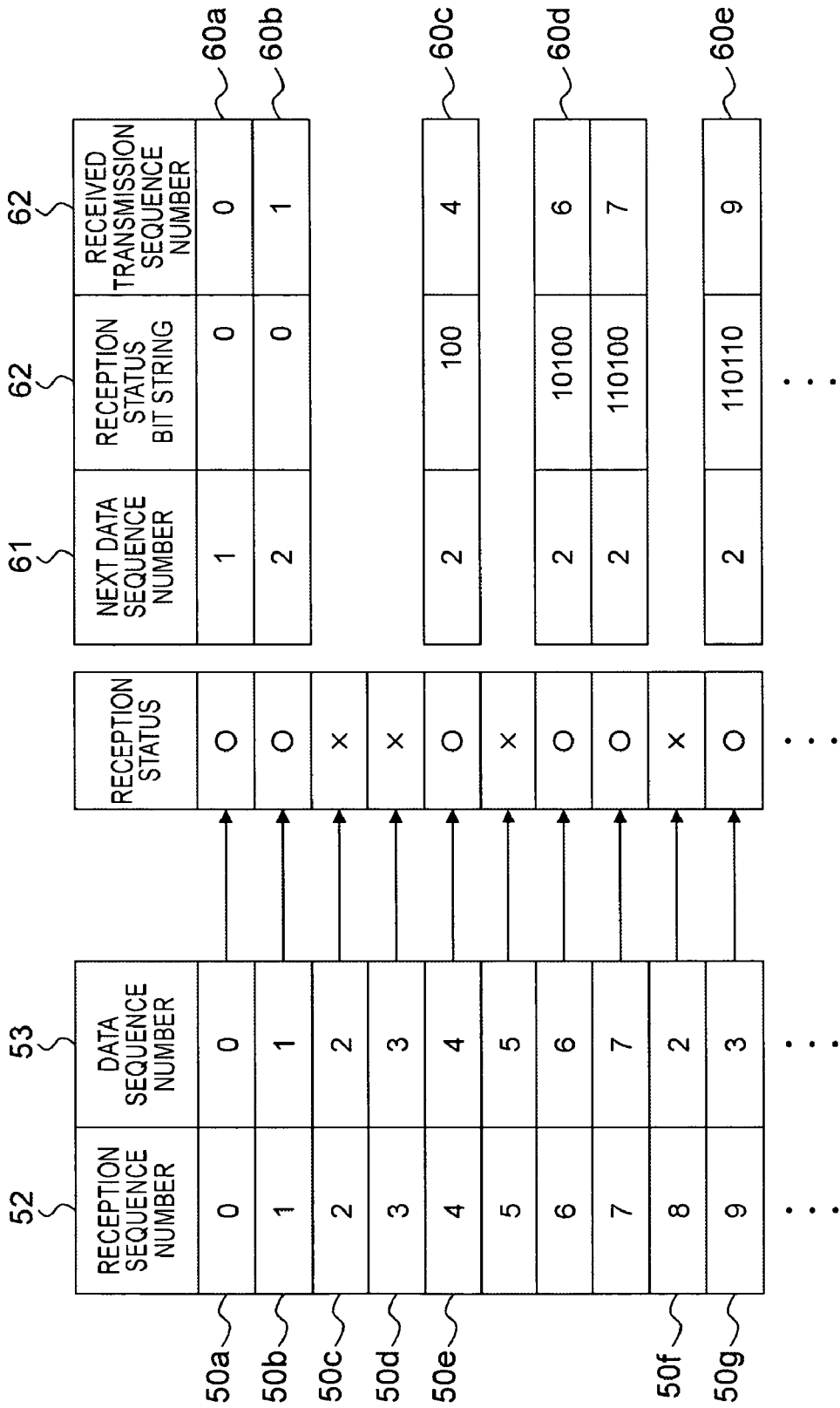
FIG. 5 is a diagram indicating the correlative relationship between a data transmission packet and an acknowledgement packet.

Next, the example FIGS. 4 and 5 will be used to explain the retransmission control conducted by the transmitter 1 and the acknowledgement packet 60 produced by the receiver 2.

FIG. 4 is a sequence chart regarding data transceiving conducted between the transmitter 1 and the receiver 2. In the same diagram, the transmitter 1 transmits the data transmission packet 50 to the receiver 2. The transmission sequence number and the data sequence number of the various packets are indicated by the transmitter 1 side. Then, whether the receiver 2 has received the various data transmission packets 50 is indicated by Xs and Os in the reception state of the receiver 2 side. Acknowledgement packets 60 are sent to the transmitter 1 for data transmission packets 50 that the receiver 2 has received.

FIG. 5 is a diagram indicating the header 51 of the data transmission packet 50 and the acknowledgement packet 60 produced in FIG. 4. In this diagram, the acknowledgement packet 60 output from the receiver 2 corresponds to the data transmission packet 50 that the contents in the header part 51 indicate.

First, the data transmission packet 50a with a transmission sequence number "0" and a data sequence number "0" is transmitted, and the receiver 2 has successfully received this packet (reception status "O"). At this time, the acknowledgement packet 60a is composed in the following manner. Specifically, because the received data sequence number is "0", the next data sequence number 61, which is the data sequence number that should be received next, becomes "1". Because no packet loss has occurred, the reception status bit string 62 is "0". Because the transmission sequence number of the data transmission packet 50a is "0", the received transmission sequence number 63 is "0".

Next, the data transmission packet 50b with a transmission sequence number "1" and a data sequence number "1" is received, and the receiver 2 successfully receives this packet (reception status "O"). This time as well an acknowledgement packet 60g (next data sequence number 61 "2", reception status bit string 62 "0", received transmission sequence number 63 "1") is produced as described above.

Subsequently, the receiver 2 fails to receive the data transmission packet 50c with transmission sequence number "2" and data sequence number "2", and data transmission packet 50d with transmission sequence number "3" and data sequence number "3", and therefore no acknowledgement packets 60 corresponding to these are output.

When the receiver 2 receives the data transmission packet 50e with transmission sequence number "4" and data sequence number "4", an acknowledgement packet 60c is produced. Specifically, here the received data sequence number is "4", but the data sequence numbers "2" and "3" have not been received. Meanwhile, because the data sequence numbers "0" and "1" have been received, the next data sequence number 61 becomes "2". Then, because the data sequence numbers "2" and "3" have not been received ("0"), and the data sequence number "4" has been received ("1"), the reception status bit string 62 becomes "100". Moreover, because the received transmission sequence number of the immediately prior received packet is "4", the received transmission sequence number 63 is "4".

Here, referring to FIG. 4, acknowledgement packets 60a, 60b, and 60c arrive at the transmitter 1 after data reception packets with data sequence numbers "3", "4" and "7" respectively have been transmitted.

Below, the subsequent acknowledgement packets 60 are produced in the same way, and are sent back to the transmitter 1.

The processing of the retransmission controller 12 when the transmitter 1 receives an acknowledgement packet 60 will be explained.

Figure 6:
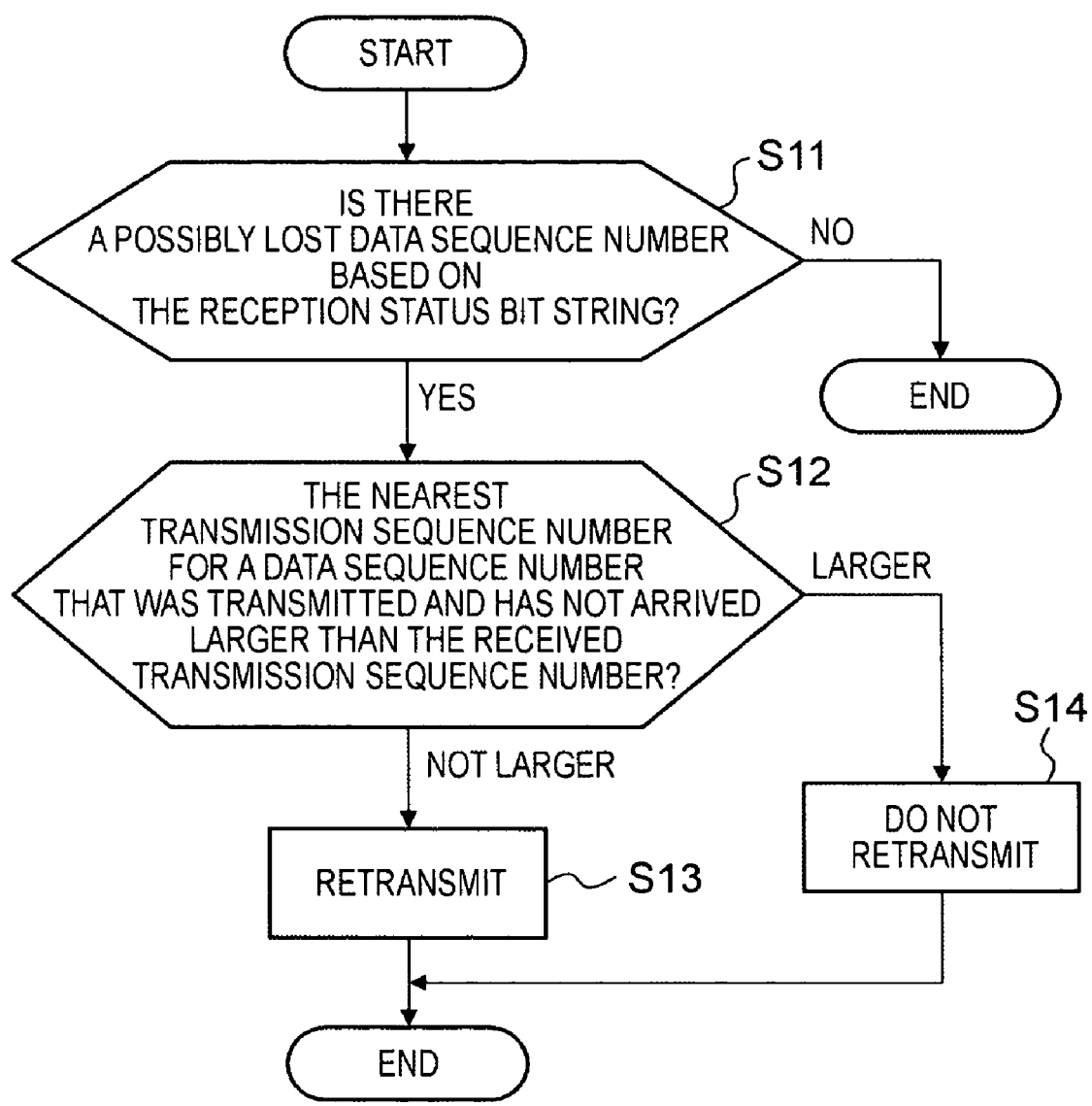
FIG. 6 is a flow chart indicating the processing procedures of a retransmission controller.

The retransmission controller 12 conducts retransmission control based on the contents of the received acknowledgement packets 60. For example, the data sequence number that should be retransmitted is specified and the data transmission unit 11 is directed to retransmit based on the contents of the acknowledgement packets 60. The data transmission unit 11 that has received a retransmit directive produces and retransmits a retransmission packet in accordance with that directive. The procedures for specifying the data sequence number that should be retransmitted are indicated in the flowchart of FIG. 6. The same diagram will be used for the following explanation.

The retransmission control unit 12 extracts the data sequence numbers 53 for packets which may have been lost based on the next data sequence number 61 and reception status bit string 62 of the received acknowledgement packet 60 (S11). If there is no possibility of packet loss (if the reception status bit string 62 is "0"), processing is concluded.

If a packet may have been lost, the retransmission control unit 12 refers to the transmission history memory unit 14, and specifies the nearest (newest) transmission sequence number 52 for which a data sequence number has been transmitted and for which the packet may have been lost. Specifically, if this data sequence number has already been retransmitted, the transmission sequence number 52 of a packet sent (retransmitted) later, and not a packet sent prior, is acquired. Then, this nearest transmission sequence number 52 and the received transmission sequence number 63 are compared (S12).

If the nearest transmission sequence number 52 is larger than the received transmission sequence number 63, the loss of the packet of that data sequence number 53 is confirmed, and therefore retransmission is directed for the confirmed lost packet (S13). Meanwhile, if the nearest transmission sequence number 52 is larger than the received transmission sequence number 63, no loss of that data sequence number 53 is confirmed, and therefore no retransmission directive is issued (S14).

For example, with the acknowledgement packets 60a and 60b indicated in FIG. 5, there is no possibility that packet loss occurred at this time because the reception status bit strings are "0", and therefore processing ends at step S11.

On the other hand, with acknowledgement packet 60c the reception status bit string 62 is "100" when step S11 processing is conducted, and the fact that the next data sequence number 61 is "2" reveals that it is possible that the packets of data sequence number "2" and "3" may have been lost.

Then, when the processing of step S12 is conducted, consulting the transmission history memory unit 14 reveals that the nearest transmission sequence numbers 52 in which possibly lost packet data sequence numbers "2" and "3" were sent are "2" and "3" respectively. Next, because the received transmission sequence number 63 of the acknowledgement packet 60c is "4", neither of the nearest transmission sequence numbers 52 are larger than "4". Consequently, it is determined that the data sequence numbers "2" and "3" must both be retransmitted. Then the data transmission unit 11 retransmits the data sequence numbers "2" and "3" at step S13.

The previously described processing in relation to this acknowledgement packet 60c is conducted at the timing of A in FIG. 4. Consequently, it is determined at the time of this A that the data sequence numbers "2" and "3" should be resent, and therefore, immediately thereafter the data transmission unit 11 retransmits the data in data transmission packets 50f, and 50g.

In the present embodiment, the occurrence of packet loss is thereby immediately detected, and the corresponding retransmission can be conducted immediately.

Next, the processing when acknowledgement packet 60d has been received will be explained. In this case as well, processing is conducted according to the flowchart indicated in FIG. 6.

Specifically, when the acknowledgement packet 60d is received, the retransmission control unit 12 specifies the possibly lost packet data sequence numbers. The reception of acknowledgement packet 60d occurs at timing B in FIG. 4, and in this case, the next data sequence number 61 is "2" and the transmission status bit string 62 is "10100" (refer to FIG. 5), and therefore, the data sequence numbers "2", "3", and "5" are possibly lost packets.

Next, when consulting the transmission history memory unit 14 to specify the nearest sent transmission sequence numbers with respect of the data sequence numbers "2", "3", and "5", the respective nearest transmission sequence numbers are "8", "9." and "5". When comparing these with the received transmission sequence number 63 "6" of the acknowledgement packet 60d, only the data sequence number "5" with the transmission sequence number "5" is targeted for retransmission. Thus, the retransmission control unit 12 directs the data transmission unit 11 to retransmit data sequence number "5".

Specifically, this indicates that the retransmitted data transmission packets 50f and 50g of the data sequence numbers "2" and "3" are in the transmission route, and may arrive at the receiver 2 in the future. In this situation, packets for re-retransmitting are not sent and confirmation of packet loss is awaited. In this way, retransmission is not implemented as long as it has not been confirmed whether packet loss has occurred. Consequently, an unnecessary increase of packets in the transmission route can be prevented.

Processing when acknowledgement packet 60e has been received will be explained. In this case as well, processing is implemented following the flowchart indicated in FIG. 6 in the same manner as described above.

The next data sequence number 61 of the acknowledgement packet 60e is "3", and the reception status bit string 62 is "110110" (refer to FIG. 5), therefore revealing that the possibly lost packet data sequence numbers are "2" and "5". Here, the retransmission control unit 12 refers to the transmission history memory unit 14, and specifies that the nearest transmission sequence numbers of data sequence numbers "2" and "5" are "8" and "5" respectively. These are compared with the received transmission sequence number 63 "9" of the acknowledgement packet 60e (refer to FIG. 5), and the data transmission unit 11 is directed to retransmit both data sequence numbers "2" and "5".

This differs from the case of acknowledgement packet 60d, and the loss of the packet of retransmitted data sequence number "2" was also confirmed. Consequently, the data sequence number "2" is re-retransmitted together with retransmitting the data sequence number "5".

Next, the reception confirmation and retransmission control of the final data will be explained using FIG. 7. In the retransmission control indicated in FIGS. 4 to 6, the reception status of data transmission packets was confirmed using the acknowledgement packets 60 sent from the receiver 2. Consequently, for example, if the data transmission packet of the final data (final data packet) is lost, no acknowledgement packet will be sent thereafter. Consequently, the transmitter 1 cannot detect packet loss of the final data packet. Thus, the receiver 1 transmits a further dummy packet after the final data packet transmission.

Figure 7:
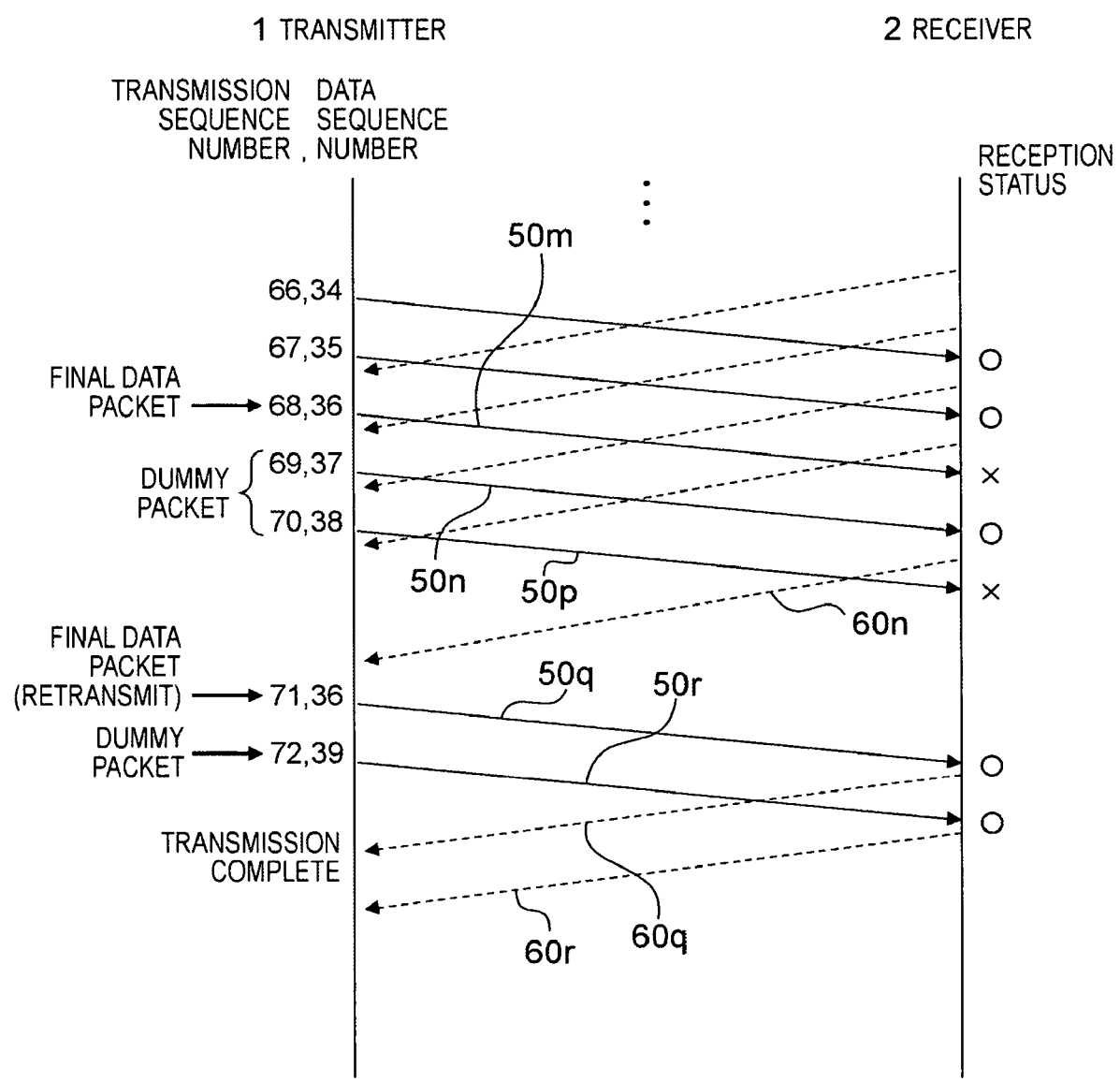
FIG. 7 is a chart of a data transceiver sequence when packet loss has occurred in the final data.

For example, in the example of FIG. 7, the transmission sequence number of the final data packet 50m is "68", and the data sequence number is "36". Here the receiver 2 has received all the data prior to the data sequence number "36" of this final data packet 50m.

After transmitting the final data packet 50m, the transmitter 1 transmits dummy packets 50n and 50p. Here, the number of dummy packets is 1 or 2 or more. Further, the dummy packet is a packet in which nothing is entered in the data part 55 (the data part 55 data content is 0), and at least the transmission sequence number 52 is set up in the header part 51. The data sequence number 53 may also be set up. In this case, the data sequence number 53 of the dummy packet may be the consecutive number from the final data packet 50m. The receiver 2 can thereby execute reception processing for the dummy packet in the same manner as for normal packets which have data set up in the data part 55.

Here, if a packet has been lost and the receiver 2 could not receive the final data packet 50m, then the acknowledgement packet relating to this will not be output. However, if the receiver 2 receives the dummy packet 50n sent after the final data packet 50m, an acknowledgement packet 60n relating to this will be sent to the transmitter 1. In this acknowledgement packet 60n the next data sequence number 61 is set to "36", the reception status bit string 62 is "10", and the received transmission sequence number 63 is "69".

When the transmitter 1 receives this acknowledgement packet 60n, the fact that the final data packet 50m has been lost is detected by the retransmission control unit 12 following the procedures indicated in FIG. 6. Then, the data transmission unit 11 produces and retransmits the retransmission packet 50q of data sequence number 36. The data transmission unit 11 also transmits a dummy packet 50r in case further packet loss occurs with this retransmission packet 50q. Then, if the transmitter 1 receives an acknowledgement packet 60q corresponding to the retransmitted final data packet 50q, data transmission is completed.

Next, the data communications system related to a second embodiment of the present invention will be explained using FIGS. 8 and 9. The following explanation will center of the points of difference from the first embodiment. Consequently, the same codes will be applied to the elements of the configuration shared with the first embodiment, and these will not be explained.

In the data communications system related to the present embodiment, the transmitter 1 and receiver 2 are comprised in the same manner as in the first embodiment. The transmitter comprises a data transmission unit 11A, a retransmission control unit 12, a data memory unit 13, and a transmission history memory unity 14. The receiver 2 comprises a data reception unit 21A, a data memory unit 22, a buffer 23, and an idle timer 24.

The idle timer 24 is a timer by which the receiver 2 measures the time that reception is interrupted (called "idle time" hereinafter). Specifically, the idle timer 24 measures the time elapsed after the data reception unit 21 receives a data transmission packet 50. Then, when the data reception unit 21 receives the next data transmission packet 50, the time measured thus far is cleared, and time measurement is begun anew. Consequently, when reception of data transmission packets 50 is interrupted, the time that the idle timer 24 measures, specifically, the idle time, continues to increase as is. Then, when the idle time reaches a pre-stipulated specified time (called the "retransmission determination time" hereinafter), the idle timer 24 notifies the data reception unit 21A.

When receiving notification from the idle timer 24A that the idle time has reached the retransmission determination time, the data reception unit 21A transmits to the transmitter 1 information indicating that reception has been idle for the retransmission determination time. Here, in order to give notification of the idle state, the acknowledgement packet 60 transmitted last (in the example of FIG. 9, the acknowledgement packet corresponding to the data transmission packet 50s) is resent.

In this regard, in the present embodiment as well, the data transmission unit 11A transmits a data transmission packet 50 to the receiver 2, and an acknowledgement packet 60 is received from the receiver 2. The data transmission packet 50 and the acknowledgement packet 60 are configured by the same format as in the first embodiment. Consequently, the transmitter 1 can ascertain the reception status at the receiver 2 based on the acknowledgement packet 60.

Here, the number of packets forwarded (number of sent data transmission packets 50 for which acknowledgement packets 60 have not been returned), which is called "window size", is determined by the data transmission unit 11A. The data transmission unit 11A comprises a counter 11B that counts the number of packets to be forwarded. Specifically, the data transmission unit 11A uses the counter 11B to calculate the difference between the number of transmitted data transmission packets 50 and the number of received acknowledgement packets 60. Then, the transmission of packets is controlled such that the value of the counter 11B becomes the window size or less. Consequently, if the window size is 3, the data transmission unit 11A can first transmit 3 data transmission packets 50 unconditionally. At this time, the counter value is "3". If the counter value is "3", the data transmission unit 11A cannot in principle transmit the next packet. Then, the data transmission unit 11A decreases the counter value by 1 when one acknowledgement packet 60 is received, and 1 is added back when transmitting the next single data transmission packet 50. As a result, the data transmission unit 11A transmits data transmission packets 50, but the number of packets for which an acknowledgement packet 60 has not been returned is kept to 3 or less.

Here, the communications procedures of a data communications system related to the present embodiment will be explained using FIG. 9. The window size in the present embodiment is 3. As described above, the number of packets that the transmitter 1 will send out without waiting for an acknowledgement packet is limited. Consequently, as indicated in the same diagram, if consecutive packets are lost, the transmission of packets from the transmitter 1 is halted for packets (50t to 50v) numbering more than the window size. As a result, the idle state in which no data transmission packets 50 are received continues at the receiver 2.

At this time, the idle timer 24 at receiver 2 is measuring the idle time. Then, when the idle time reaches the pre-stipulated retransmission determination time or more, the idle timer 24 notifies the data reception unit 21 of that fact. When receiving this notification, the data reception unit 21 retransmits to the transmitter 1 the acknowledgement packet 60s that was sent immediately prior in order to give notification that the idle state has continued for the retransmission determination time or more. Further, the idle timer 24 is cleared when retransmission has been implemented. Then, the idle timer 24 may immediately restart the measurement of idle time, or may restart measurement of idle time after an interval of a specified time has passed.

Here, the retransmitted acknowledgement packet 60s arrives at the transmitter 1. When the data transmission unit 11A detects that this packet is the same as the acknowledgement packet 60s that was received immediately prior, it is determined that the receiver 2 has reached the idle state. Thus, the data transmission unit 11A temporarily raises the window size (here the window size in increased to 4), and data transmission packet 50w, which has the following consecutive data sequence number, is transmitted. If the following data sequence number has no data, then a dummy packet is transmitted. Specifically, even if an acknowledgement packet 60 has not already been received for the data transmission packet 50 greater than the window size, the transmitter 1 transmits the following consecutive packet.

Here, when the receiver 2 receives the following consecutive data transmission packet 50w, an acknowledgement packet 60w corresponding to this is produced and sent back to the transmitter 1 following the procedures explained for the first embodiment.

When the transmitter 1 receives the acknowledgement packet 60w, the retransmission control unit 12 specifies the data sequence numbers that should be retransmitted based on this acknowledgement packet 60w in the same manner as in the first embodiment. Then, the data transmission unit 11 also retransmits based on the directive from the retransmission control unit 12 in the same manner as in the first embodiment. Specifically, as indicated in the same diagram, the data sequence numbers "2", "3", and "4" are retransmitted respectively.

In the present embodiment, when the idle state continues for the specified time or more, the receiver 2 retransmits the acknowledgement packet 60 in order to resolve this. The reason is that the size of the acknowledgement packet 60 is extremely small compared to the data transmission packet 50, and the load on the transmission route can be kept small. Further, the load on the transmission route is small based on retransmitting acknowledgement packets 60, and therefore the burden on the transmission route is not increased that much even if the retransmission determination time is shortened.

The embodiments of the present invention described above are examples for explaining the present invention, and do intend to limit the scope of the present invention to only these embodiments. A person skilled in the art may implement the present invention in a variety of other forms without deviating from the essentials of the present invention.

For example, the data communications functions explained in the aforementioned embodiments may be may be implemented by packaging in an expansion card that can be mounted in or removed from a computer so that the functions are added to the computer.

What is claimed is:

1. A method for controlling retransmission of data comprising:

transmitting, from a first communications device to a second communications device, a first data packet comprising a data part, a data sequence number, and a transmission sequence number, wherein the data part stores the data, the data being divided into a plurality of divided data blocks, wherein the data sequence number indicates the order of each divided data block in relation to each other of the plurality of divided data blocks, and wherein the transmission sequence number indicates the transmission order of the first data packet;

when the first data packet is received by the second communications device, transmitting from the second communications device to the first communications device an acknowledgement packet acknowledging receipt of the first data packet, wherein the acknowledgement packet comprises a received transmission sequence number of the first data packet, a next data sequence number, and reception status information, wherein the received transmission sequence number indicates the transmission sequence number received immediately prior to transmitting the acknowledgement packet, wherein the next data sequence number indicates the data sequence number that the second communications device should receive next, and is a number obtained by adding 1 to the value of the highest data sequence number from among consecutive data sequence numbers already received, wherein the reception status information indicates the reception status of the data sequence numbers after the received next data sequence number up to a value of the highest of the received data sequence numbers, each of the received data sequence numbers corresponding to a divided data block of the plurality of divided data blocks, wherein the reception status information indicates the reception status of the data sequence numbers in a bit string, and wherein each bit of the bit string indicates whether each divided data block has been received or not; and specifying and transmitting, by the first communications device, each divided data block corresponding to a data sequence number that requires retransmission, the selection of the divided data block requiring retransmission being based on the reception status information received from the acknowledgement packet.

2. A communications system comprising:

a transmitter; and a receiver, wherein the transmitter comprises:

a first transmitting unit that transmits data packets, each data packet comprising a data part, a data sequence number, and a transmission sequence number, wherein the data part stores the data, the data being divided into a plurality of divided data blocks, wherein the data sequence number indicates the order of each divided data block in relation to each other of the plurality of divided data blocks, and wherein the transmission sequence number indicates the transmission order of the data packet;

a first receiving unit that receives an acknowledgement packet, which is transmitted by the receiver that has received a first data packet, the acknowledgement packet acknowledging receipt of the first data packet, wherein the acknowledgement packet comprises a received transmission sequence number of the first data packet, a next data sequence number, and reception status information, wherein the received transmission sequence number indicates the transmission sequence number received immediately prior to transmitting the acknowledgement packet, wherein the next data sequence number indicates the data sequence number that the receiver should receive next, and is a number obtained by adding 1 to the value of the highest data sequence number from among consecutive data sequence numbers already received, and wherein the reception status information indicates the reception status of the data sequence numbers after the received next data sequence number up to a value of the highest of the received data sequence numbers, each of the received data sequence numbers corresponding to a divided data block of the plurality of divided data blocks, wherein the reception status information indicates the reception status of the data sequence numbers in a bit string, and wherein each bit of the bit string indicates whether each divided data block has been received or not;

a memory that stores the transmission history of the data packets that the first transmitting unit has transmitted; and a retransmission controller that specifies each divided data block corresponding to a sequence number requiring retransmission, the selection of the divided data block requiring retransmission being based on the reception status information received from the acknowledgement packet by referring to the memory, and that directs the first transmitting unit to retransmit each divided data block corresponding to the sequence number specified, wherein the receiver comprises:

a second receiving unit that receives the data packets transmitted from the transmitter; and a second transmitting unit that transmits the acknowledgement packet to the transmitter when the second receiving unit receives the first data packet transmitted from the transmitter.

3. The communications system according to claim 2, wherein the retransmission controller:

extracts one or more not received data sequence numbers which the transmitter has transmitted but the receiver has not received, from between the next sequence number and the value of the highest of the received data sequence numbers, based on information indicating the reception status included in one of the acknowledgement packets;

acquires from the memory the newest one or more not received transmission sequence numbers of one or more data packets for which divided data blocks related to the not received data sequence numbers has been sent;

specifies one or more data sequence numbers corresponding to one or more transmission sequence numbers which are less than the transmission sequence number included in the acknowledgement packet, from among the one or more not received data sequence numbers; and determines the specified one or more data sequence numbers as being one or more data sequence numbers requiring retransmission.

4. The communications system according to claim 2 wherein the receiver further comprises:

a buffer that temporarily stores data sequence numbers included in data packets that the second receiving unit has received; and a producing unit that produces the acknowledgement packets by referring to the buffer.

5. The communications system according to claim 2, wherein the first transmitting unit of the transmitter controls the transmission of the data packets such that the number of transmitted data packets for which no acknowledgement packet has been received becomes a specified number or less, and wherein the receiver further comprises:

a timer that, during an interval after a third data packet is received until a fourth data packet that arrives next is received, measures the time elapsed since receiving the third data packet, and wherein the second transmitting unit transmits to the transmitter information indicating that no data packet has been received in the specified time or more if the time that the timer has measured reaches or exceeds a specified time.

6. The communications system according to claim 5, wherein if the transmitter receives information indicating that no data packet has been received in the specified time or more, the first transmitting unit transmits the next data packet even if the number of transmitted data packets for which acknowledgement packets have not been received is the specified number or more.

7. The communications system according to claim 2, wherein after transmitting data packets for all the divided data blocks, the first transmitting unit transmits a dummy packet that comprises a transmission sequence number, and does not comprise any divided data blocks.

8. A communications device comprising:

a transmitting unit that transmits data packets to a receiver, each data packet comprising a data part, a data sequence number, and a transmission sequence number, wherein the data part stores the data, the data being divided into a plurality of divided data blocks, wherein the data sequence number indicates the order of each divided data block in relation to each other of the plurality of divided data blocks, and wherein the transmission sequence number indicates the transmission order of the data packet;

a receiving unit that receives an acknowledgement packet, which is sent back by a destination communications device that has received a first data packet, the acknowledgement packet acknowledging receipt of the first data packet, wherein the acknowledgement packet comprises a received transmission sequence number of the first data packet, a next data sequence number, and a reception status information, wherein the received transmission sequence number indicates the transmission sequence number received immediately prior to transmitting the acknowledgement packet, wherein the next data sequence number indicates the data sequence number that the receiver should receive next, and is a number obtained by adding 1 to the value of the highest data sequence number from among consecutive data sequence numbers already received, wherein the reception status information indicates the reception status of the data sequence numbers after the received next data sequence number up to a value of the highest of the received data sequence numbers, each of the received data sequence numbers corresponding to a divided data block of the plurality of divided data blocks, wherein the reception status information indicates the reception status of the data sequence numbers in a bit string, and wherein each bit of the bit string indicates whether each divided data block has been received or not;

a memory that stores the transmission history of the data packets that the transmitting unit has transmitted; and a retransmission controller that specifies each divided data sequence number requiring retransmission, the selection of the divided data block requiring retransmission being based on the acknowledgement packet by referring to the memory, and that directs the transmitting unit to retransmit each divided data corresponding to the sequence number specified.

9. The communications device according to claim 8, further comprising:

a counter that counts the number of transmitted data packets for which acknowledgement packets have not been received, wherein the transmitting unit controls the transmission of data packets such that the value of the counter is a specified number or less, and wherein when receiving information, from the destination communications device, indicating that a data packet has not been received in a specified time or more, the transmitting unit transmits the next data packet even though the value of the counter is the specified number or more.

10. A communications device comprising:

a receiving unit that receives data packets, each data packet comprising a data part, a data sequence number, and a transmission sequence number, wherein the data part stores the data, the data being divided into a plurality of divided data blocks, wherein the data sequence number indicates the order of the each divided data block in relation to each other of the plurality of divided data blocks, and wherein the transmission sequence number indicates the transmission order of the data packet; and a transmitting unit that transmits an acknowledgement packet to a transmission source of a first data packet when the receiving unit receives the first data packet, the acknowledgement packet acknowledging receipt of the first data packet, wherein the acknowledgement packet comprises a received transmission sequence number of the first data packet, a next data sequence number, and reception status information, wherein the received transmission sequence number indicates the transmission sequence number received immediately prior to transmitting the acknowledgement packet, wherein the next data sequence number indicates the data sequence number that the receiving unit should receive next, and is a number obtained by adding 1 to the value of the highest data sequence number from among consecutive data sequence numbers already been received, wherein the reception status information indicates the reception status of the data sequence numbers after the received next data sequence number up to a value of the highest of the received data sequence numbers, each of the received data sequence numbers corresponding to a divided data block of the plurality of divided data blocks, wherein the reception status information indicates the reception status of the data sequence numbers in a bit string, and wherein each bit of the bit string indicates whether each divided data block has been received or not.

11. The communication device according to claim 10, further comprising:

a timer that, during an interval after the receiving unit receives a third data packet until receiving a fourth data packet that arrives next, measures the time elapsed since receiving the third data packet, wherein the transmitting unit transmits to the transmission source of the data packets information indicating that no data packet has been received in the specified time or more if the time that the timer has measured reaches or exceeds a specified time.

12. A retransmission control method comprising:

transmitting, by a transmitter, data packets to a receiver, each data packet comprising a data part, a data sequence number, and a transmission sequence number, wherein the data part stores the data, the data being divided into a plurality of divided data blocks, wherein the data sequence number indicates the order of the each divided data block in relation to each other of the plurality of divided data blocks, and wherein the transmission sequence number indicates the transmission order of the data packet;

storing in a memory the transmission history of the transmitted data packets;

receiving an acknowledgement packet from the receiver which has received a first data packet, the acknowledgement packet acknowledging receipt of the first data packet, wherein the acknowledgement packet comprises a received transmission sequence number of the first data packet, a next data sequence number, and reception status information, wherein the received transmission sequence number indicates the transmission sequence number received immediately prior to transmitting the acknowledgement packet, wherein the next data sequence number indicates the data sequence number that the receiver should receive next, and is a number obtained by adding 1 to the value of the highest data sequence number from among consecutive data sequence numbers already received, wherein the reception status information indicates the reception status of the data sequence numbers after the received next data sequence number up to a value of the highest of the received data sequence numbers, each of the received data sequence numbers corresponding to a divided data block of the plurality of divided data blocks, wherein the reception status information indicates the reception status of the data sequence numbers in a bit string, and wherein each bit of the bit string indicates whether each divided data block has been received or not; and specifying each divided data block corresponding to a sequence number requiring retransmission, the selection of the divided data block requiring retransmission being based on the reception status information received from the acknowledgement packet by referring to the memory, and retransmitting each divided data block corresponding to the sequence number specified.

13. The retransmission control method according to claim 12, further comprising:

transmitting data packets such that the number of transmitted data packets for which an acknowledgement packet has not been received is a specified number or less;

receiving information from the destination communications device indicating that no data packet has been received in a specified time or more when the number of transmitted data packets for which the acknowledgement packets have not been received is the specified number; and transmitting the next data packets to be transmitted.

14. A non-transitory computer readable storage medium, tangibly embodying a computer program executable by a computer to perform method steps for retransmission control, said method steps comprising:

transmitting, by a transmitter, data packets to a receiver, each data packet comprising a data part, a data sequence number, and a transmission sequence number, wherein the data part stores the data, the data being divided into plurality of divided data blocks wherein the data sequence number indicates the order of each divided data block in relation to each other of the plurality of divided data blocks, and wherein the transmission sequence number indicates the transmission order of the data packet;

storing in a memory the transmission history of the transmitted data packets; receiving an acknowledgement packet from the receiver which has received a first data packet, the acknowledgement packet acknowledging receipt of the first data packets, wherein the acknowledgment packet comprises a received transmission sequence number of the first data packet, a next data sequence number and reception status information, wherein the received transmission sequence number indicates the transmission sequence number received immediately prior to transmitting the acknowledgement packet, wherein the next data sequence number indicates the data sequence number that the receiver should receive next, and is a number obtained by adding 1 to the value of the highest data sequence number from among consecutive data sequence numbers already received, wherein the reception status information indicates the reception status of the data sequence numbers after received next data sequence number up to a value of the highest of the received data sequence numbers, each of the received data sequence numbers corresponding to a divided data block of the plurality of divided data blocks, wherein the reception status information indicates the reception status of the data sequence numbers in a bit string and wherein each bit of the bit string indicates whether each divided data block has been received or not; and specifying each divided data block corresponding to a sequence number requiring retransmission, the selection of the divided data block requiring retransmission being based on the reception status information received from the acknowledgement packet by referring to the memory, and retransmits each divided data block corresponding to the sequence number.

15. A data reception and response method comprising:

receiving, by a receiver, data packets, each data packet comprising a data part, a data sequence number, and a transmission sequence number, wherein the data part stores the data, the data being divided into a plurality of divided data blocks, wherein the data sequence number indicates the order of the each divided data block in relation to each other of the plurality of divided data blocks, and wherein the transmission sequence number indicates the transmission order of the data packet; and transmitting, to a transmission source of the data packets, an acknowledgement packet, the acknowledgement packet being transmitted when the receiver receives the first data packet, wherein the acknowledgement packet comprises a received transmission sequence number of the first data packet, a next data sequence number, and reception status information, wherein the received transmission sequence number indicates the transmission sequence number received immediately prior to transmitting the acknowledgement packet, wherein the next data sequence number indicates the data sequence number that the receiver should receive next, and is a number obtained by adding 1 to the value of the highest of the continuous data sequence number from among consecutive data sequence numbers already received, wherein the reception status information indicates the reception status of the data sequence numbers after the received next data sequence number up to a value of the highest of the received data sequence numbers, each of the received data sequence numbers corresponding to a divided data block of the plurality of divided data blocks, wherein the reception status information indicates the reception status of the data sequence numbers in a bit string, and wherein each bit of the bit string indicates whether each divided data block has been received or not.

16. The data reception and response method according to claim 15, further comprising:

measuring time elapsed since the data packet is received; and transmitting to the communications device that is the source of the data packet, information indicating that no data packet has been received in the specified time or more, if the elapsed time exceeds the specified time before the next data packet is received.

17. A non-transitory computer readable storage medium, tangibly embodying a computer program executable by a computer to perform method steps for data reception and response, said method steps comprising:

receiving, by a receiver, data packets, each data packet comprising a data part, a data sequence number, and a transmission sequence number, wherein the data part stores the data, the data being divided into a plurality of divided data blocks wherein the data sequence number indicates the order of each divided data block in relation to each other of the plurality of divided data blocks, and wherein the transmission sequence number indicates the transmission order of the data packet; and transmitting, to a transmission source of the data packets, an acknowledgement packet, the acknowledgement packet being transmitted when the receiver receives a first data packet, wherein the acknowledgement packet a received transmission sequence number of the first data packet, a next data sequence number, and reception status information, wherein the received transmission sequence number indicates the transmission sequence number received immediately prior to transmitting the acknowledgement packet, wherein the next data sequence number indicates the data sequence number that the receiver should receive next, and is a number obtained by adding 1 to the value of the highest data sequence number from among consecutive data sequence numbers already received, wherein the reception status information indicates the reception status of the data sequence numbers after the received next data sequence number up to a value of the highest of the received data sequence numbers, each of the received data sequence numbers corresponding to a divided data block of the plurality of divided data blocks, wherein the reception status information indicates the reception status of the data sequence numbers in a bit string and wherein each bit of the bit string indicates whether each divided data block has been received or not.

\* \* \* \* \*